United States Patent
Santos et al.

(10) Patent No.: US 6,684,247 B1
(45) Date of Patent: Jan. 27, 2004

(54) METHOD AND SYSTEM FOR IDENTIFYING CONGESTION AND ANOMALIES IN A NETWORK

(75) Inventors: Elisa M. Santos, Chatham, NJ (US); Samaradasa Weerahandi, Millington, NJ (US); Ricardo Martija, East Brunswick, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 09/542,301

(22) Filed: Apr. 4, 2000

(51) Int. Cl.[7] ............... G06F 15/173; G06F 15/16
(52) U.S. Cl. ............... 709/224; 709/223; 709/225; 709/227; 703/2
(58) Field of Search ............... 709/223, 224, 709/225, 226; 703/2

(56) References Cited

U.S. PATENT DOCUMENTS 5,583,792 A * 12/1996 Li et al. ............... 364/514
6,173,323 B1 * 1/2001 Moghe ............... 709/224
6,539,427 B1 * 3/2003 Natarajan et al. ............... 709/224

OTHER PUBLICATIONS

W. Daniel Hillis & Bruce M. Boghosian, Parallel Scientific Computation, vol. 261.*

* cited by examiner

*Primary Examiner*—Rupal Dharia
*Assistant Examiner*—Adnan Mirza
(74) *Attorney, Agent, or Firm*—Joseph Giordano; James W. Falk (57) ABSTRACT

Methods and systems are provided for identifying congestion and anomalies at individual nodes, links, and segments in a network. In accordance with an embodiment of the invention, a monitoring station determines for each link in the network a statistical model based on a harmonic analysis. The monitoring station collects from each link metric data. The monitoring station then selects for each link a model that includes one or more harmonic components. By estimating parameters of the harmonic components, the monitoring station then captures the periodicity of the collected metric data in the harmonic components of the model. The monitoring station uses the model to estimate the state of the network from which estimated values of the metric data are determined. The monitoring station then determines whether congestion or anomalies exist in the links based on the estimated metrics.

8 Claims, 8 Drawing Sheets

METHOD AND SYSTEM FOR IDENTIFYING CONGESTION AND ANOMALIES IN A NETWORK

BACKGROUND OF THE INVENTION

The present invention relates generally to monitoring of networks, and more particularly, to a method and system for identifying congestion and anomalies in networks.

With the rapid emergence and growth of networks, monitoring network performance has become an essential aspect of network management. For example, as increasing number of businesses and consumers rely on the Internet for accessing information and conducting commerce, there is a greater need for assuring quality of services provided by network service providers, such as Internet Service Providers (ISPs).

To assure the quality of services provided by the ISPs, a number of performance monitoring tools have emerged. These tools measure performance metrics, such as latency, throughput, bandwidth, network availability, etc. from the perspective of one or more monitoring nodes located at various points in the network. Specifically, the tools measure "monitor-to-destination" performance of a network by sending special messages, such as Simple Network Management Protocol (SNMP) messages from the monitoring nodes to various destination nodes in the network.

One example of a monitor-to-destination performance tool is the Internet Traffic Report (ITR) tool. ITR is provided by Andover News Network and is available at "http://www.internettrafficreport.com." ITR monitors the flow of information on the Internet and generates indexes that measure the reliability and performance of major paths in the Internet. For example, ITR performs "ping" tests to measure round-trip delay along major paths on the Internet. ITR compares the response associated with each ping test with past responses from the same test, and based on the response, determines a performance score on a scale of zero to 100. ITR then averages the scores into an index that represents the amount of traffic on the Internet. The index, however, does not identify congestion and anomalies at individual nodes, links, or small segments in the Internet.

One alternative to ITR is the Matrix Information and Directory Services (MIDS) tool, which is provided by Matrix Internet Quality and is available at "http://www.miq.net." MIDS measures performance metrics associated with destination nodes in the Internet, such as Domain Name System (DNS) servers, Top Level Domain (TLD) servers, routers, etc. MIDS compares the metrics associated with various ISP networks and the Internet as a whole to evaluate the performance and reliability of services provided by the ISPs. Although Matrix Internet Quality claims in its web site that MIDS is capable of isolating network performance problems to specific servers, routers, links, or interconnection points in the Internet, it is not known whether MIDS can reliably identify congestion and anomalies without generating large number of false alarms.

DESCRIPTION OF THE INVENTION

To overcome the above and other disadvantages of the prior art, it is desired to provide methods and systems for identifying congestion and anomalies at individual nodes, links, and segments in networks.

In accordance with an embodiment of the invention, a monitoring station determines for each link in a network a statistical model that is based on a harmonic analysis. Based on the model, the monitoring station estimates one or more metrics associated with each of the links. Using the estimated metrics, the monitoring station then determines whether congestion or anomalies exist at each link.

In determining a model for each link in the network, the monitoring station collects from each link metric data, such as time delay, packet loss, throughput, or any other data associated with a link. The monitoring station then selects for each link a model that includes one or more harmonic components, such as a sum of sinusoidal components. By estimating parameters of the harmonic components, the monitoring station then captures the periodicity of the collected metric data in terms of the harmonic components of the model. The monitoring station uses the model to estimate the normal state of the network from which estimated metric data are determined.

Based on the estimated metric data for each link, the monitoring station then determines whether congestion exists at each individual link. For example, the monitoring station determines an average value and a variance for the estimated metric data associated with a link. Based on the average value, the variance, and a predetermined threshold, the monitoring station determines a z-value and a corresponding p-value. If the p-value is smaller than a predetermined statistical significance, the monitoring station determines that a congestion exists in the link. Thus, by comparing the p-value of the estimated metric data with the predetermined statistical significance, the monitoring station identifies in the collected metric data signals that are indicative of a congestion in the link, instead of identifying peaks and bursts that are mostly natural random variations in the collected metric data and are not indicative of a congestion.

Using a statistical model that is based on a harmonic analysis, the monitoring station may also determine whether one or more anomalies exist at each individual link in the network. For example, the monitoring station collects new metric data associated with a link, and using the model, estimates metric data associated with that link. The monitoring station then determines a residual between the newly collected metric data and the estimated metric data. The monitoring station searches for anomalous patterns in the residual using, for example, a statistical control method to determine whether an anomaly exists in the link. Thus, by statistically modeling metrics associated with each link under normal network conditions and monitoring the residual associated with each link, the monitoring station determines whether an anomaly exists in a link.

For example, based on the residuals, the monitoring station determines a first diagnostic for detecting a persistent step change in the new metric data associated with the link and determines a second diagnostic for detecting a persistent slope change in the new metric data. The monitoring station then determines a first p-value associated with the first diagnostic and a second p-value associated with the second diagnostic. If the first p-value or the second p-value is smaller than a predetermined threshold, the monitoring station determines that an anomaly exists in the link.

In another embodiment of the invention, a monitoring station determines for each node in a network a statistical model that is based on a harmonic analysis. A node may include, for example, a router, switch, bridge, host, connection point, or any other processing device. Based on the model, the monitoring station estimates one or more metrics associated with each of the nodes. Using the estimated metrics, the monitoring station then determines whether congestion or anomalies exist at each node.

In yet another embodiment of the invention, a monitoring station determines for each segment in a network a statistical model that is based on a harmonic analysis. A segment may include, for example, one or more nodes and links in the network. Based on the model, the monitoring station estimates one or more metrics associated with each of the segments. Using the estimated metrics, the monitoring station then determines whether congestion or anomalies exist in each segment.

Accordingly, methods and systems consistent with the present invention have several advantages over the prior art. For example, such methods and systems statistically model metrics collected from individual links, nodes, and segments to estimate behavior of a network. By capturing the periodicity of the collected metrics in terms of harmonic components of the model, such methods and systems identify, in real-time, in the collected metrics distribution signals or patterns that are indicative of congestion or anomalies, instead of identifying peaks and bursts that are mostly natural random variations in the metric data, thus reducing the number of false alarms that may be generated.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

In accordance with an embodiment of the invention, a monitoring station determines whether congestion and anomalies exist at individual nodes, links, or segments in a network. The monitoring station determines for each link in the network a statistical model that is based on a harmonic analysis. Based on the model, the monitoring station estimates one or more metrics associated with each of the links. Using the estimated metrics, the monitoring station then determines whether congestion or anomalies exist in each individual link.

Figure 1:
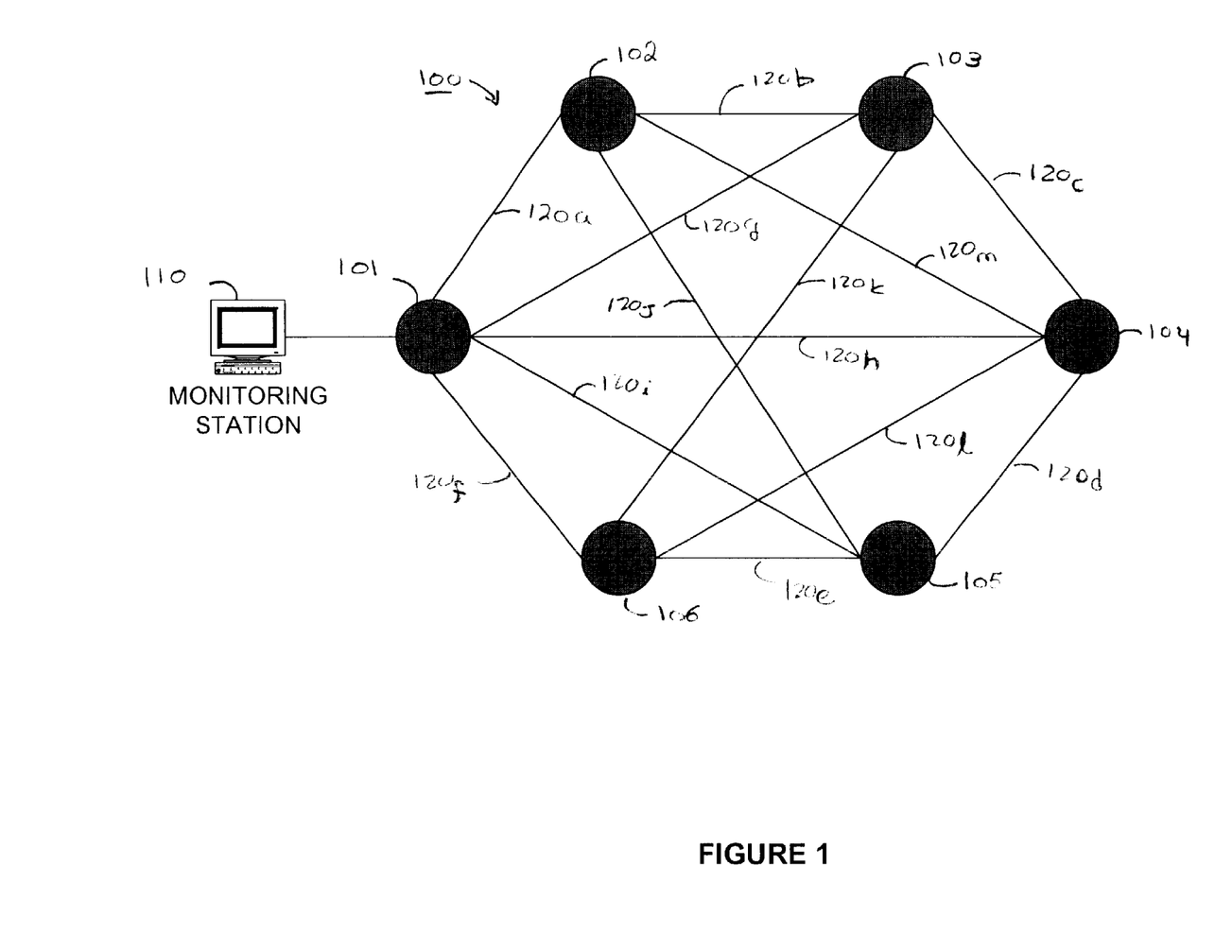
FIG. 1 is a schematic representation of a network, in accordance with methods and systems consistent with the present invention.

FIG. 1 is a schematic representation of a network 100 and a monitoring station 110, in accordance with methods and systems consistent with the invention. As shown, network 100 includes nodes 101 through 106, which are interconnected via links 120a through 120m, respectively. Network 100 may include any type of network, such as an Internet Protocol (IP) network, the Internet, an Intranet, or an Extranet. Nodes 101 through 106 may include, for example, routers, switches, bridges, hosts, a connection point, or any other processing devices. Monitoring station 110 may directly interface with network 100 via node 101 as shown, or alternatively, may indirectly interface with network 100 via one or more other networks (not shown).

Figure 2:
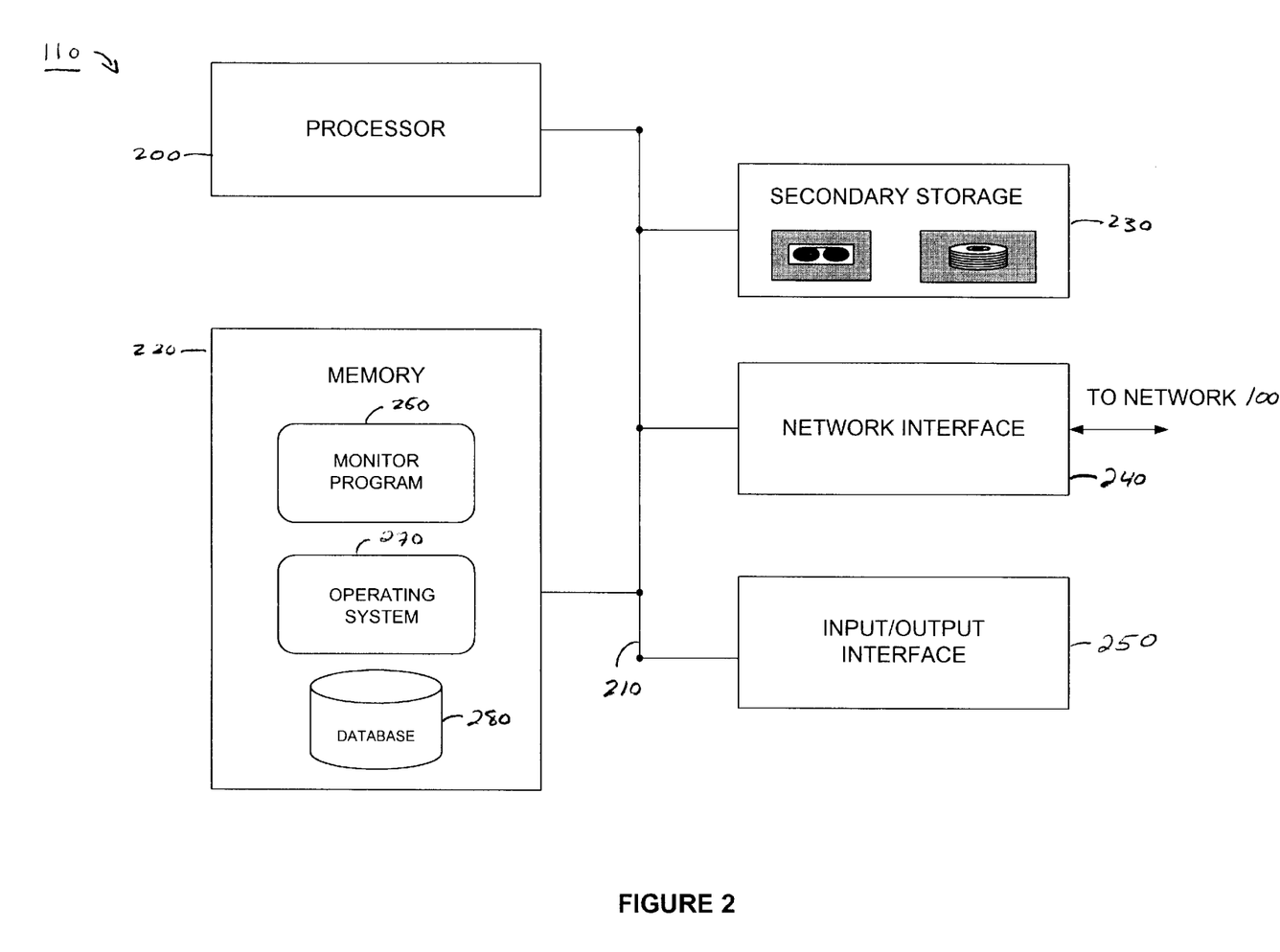
FIG. 2 is a block diagram of a monitoring station, in accordance with methods and systems consistent with the present invention.

FIG. 2 is a block diagram of monitoring station 110, in accordance with methods and systems consistent with the invention. As shown, monitoring station 110 includes a processor 200, which connects via bus 210 to a memory 220, a secondary storage 230, a network interface module 240, and an input/output module 250.

Memory 220 includes a monitoring program 260, an operating system 270, and a database 280. Monitoring program 260 includes software, which processor 220 executes for identifying congestion and anomalies in network 100. Database 280 includes data collected from network 100, such as time delay, bandwidth, throughput, packet loss, or any other metric associated with one or more links 120a–120m, and other data internally generated by monitoring program 260.

Secondary storage 230 comprises a computer readable medium such as a disk drive and a tape drive. From the tape drive, software and data may be loaded onto the disk drive, which can then be copied into memory 220. Similarly, software and data in memory 220 may be copied onto the disk drive, which can then be loaded onto the tape drive.

Network interface module 240 includes hardware and software for sending and receiving information from network 100.

Input/Output interface 250 may include, for example, a key board or a key pad and a display unit.

Figure 3:
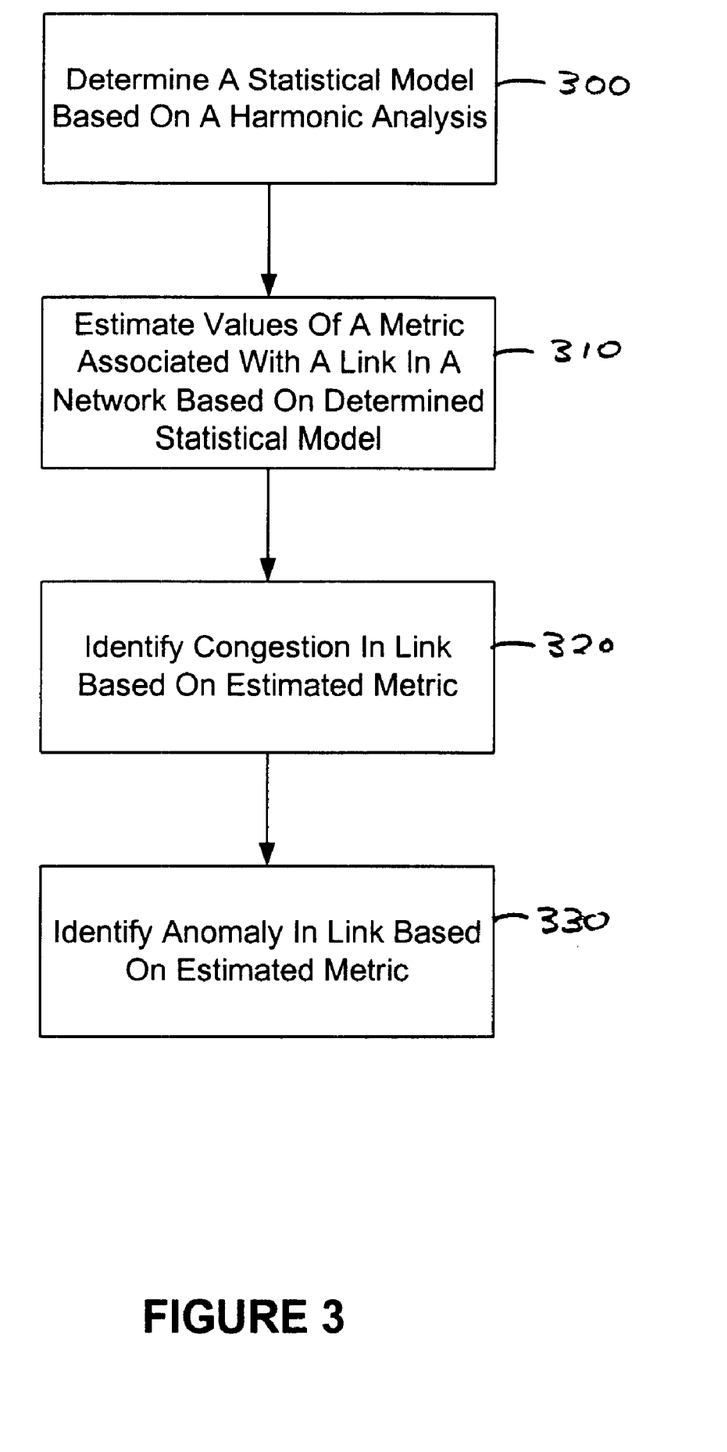
FIG. 3 is a flowchart of the steps for identifying congestion and anomalies in a network, in accordance with methods and systems consistent with the present invention.

FIG. 3 is a flowchart of the steps performed by monitoring program 260 for identifying congestion and anomalies in network 100, in accordance with methods and systems consistent with the invention. Based on a harmonic analysis, monitoring program 260 determines a statistical model for each of links 120a–120m in network 100 (Step 300). Using the model, monitoring program 260 estimates metric data associated with each of links 120a–120m (Step 310). Based on the estimated metric data, monitoring program 260 may then determine whether congestion exists in one or more links 120a–120m (Step 320). Monitoring program 260 may also determine whether anomalies exist in one or more links 120a–120m based on the estimated metric (Step 330).

Figure 4:
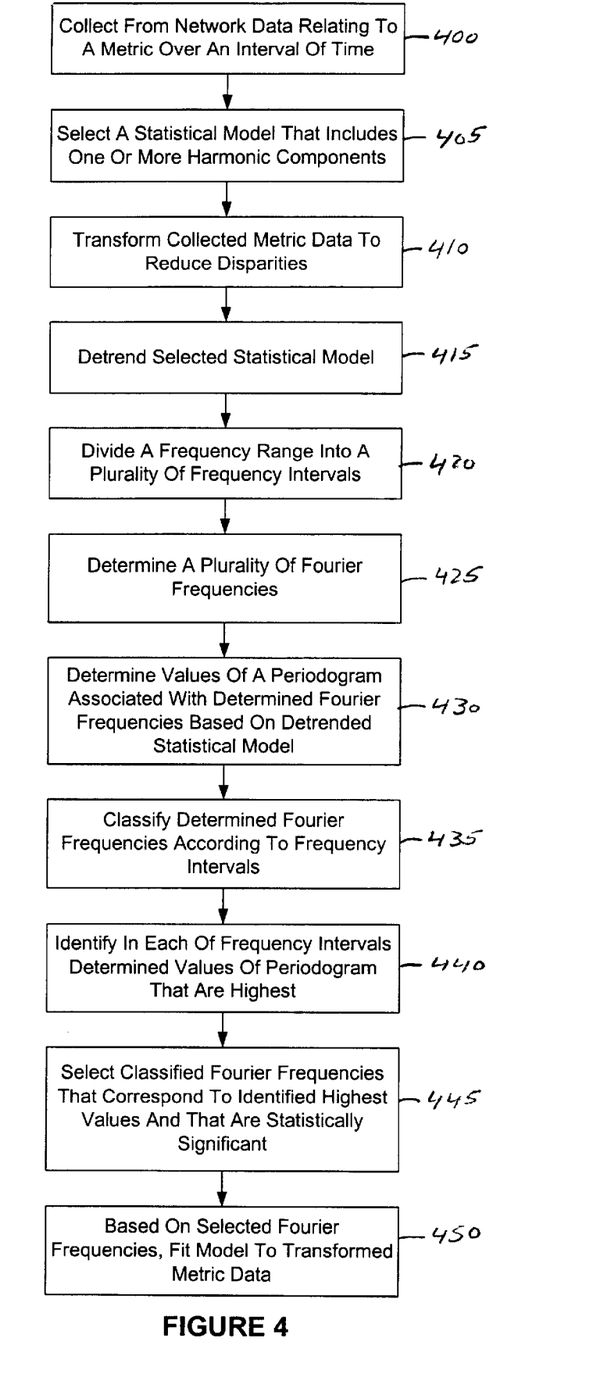
FIG. 4 is a flowchart of the steps for determining a statistical model based on a harmonic analysis for estimating a metric associated with a link in a network, in accordance with methods and systems consistent with the present invention.

FIG. 4 is a flowchart of the steps by monitoring program 260 for determining a statistical model for each of links 120a–120m, in accordance with methods and systems consistent with the invention. Monitoring program 260 may measure metric data associated with links 120a–120m over an interval of time I using any known method (Step 400). For example, monitoring program 260 may first determine the topology of network 100 using tools, such as Traceroute or Simple Network Management Protocol (SNMP). After determining the topology, monitoring program 260 may then measure metric data associated with each of links 120a–120m. The monitoring program 260 may directly measure the metric data, or alternatively, indirectly via one or more monitoring nodes located throughout network 100.

Monitoring program 260 may store the metric data along with other associated information in database 280. The metric data may include, for example, time delay, bandwidth, throughput, performance data, packet loss, or any other data associated with links 120a–120m. For example, the time delay associated with link 120m represents the time it takes for a signal to travel from node 102 to node 104 on link 120m. The associated information may include, for example, an identifier associated with node 102, an identifier associated with node 104, and the date and time when a particular measurement is made.

Monitoring program 260 then selects for each of links 120a–120m a statistical model that includes one or more harmonic components (Step 405). In accordance with one embodiment of the invention, the selected model may be represented as follows:

$$y_t = \beta_0 + \beta_1 t + \sum_{k=1}^{J} (A_k \cos \omega_k t + B_k \sin \omega_k t) + \varepsilon_t,$$

where $y_t$ represents estimated metric data measured at time t, and $\varepsilon_t$ represents the associated error in the estimated metric data. As shown below in detail, monitoring program 260 estimates the parameters $\beta_0$, $\beta_1$, $A_k$, $B_k$, J and $\omega_k$ such that the distance between the estimated metric data and the measured metric data is small while maintaining a parsimonious model.

To reduce disparities in the measured metric data, monitoring program 260 transforms the metric data using, for example, a Box-Cox transformation (Step 410). The family of Box-Cox transformations is described in G. E. P. Box and D. R. Cox, "An Analysis of Transformations," Journal of The Royal Statistical Society, pp. 211–252 (1964), which is incorporated herein by reference. Monitoring program 260 may identify an optimal transformation from within the Box-Cox family of transformations such that the likelihood the transformed data follows a normal distribution is maximized.

Monitoring program 260 then detrends the model by, for example, subtracting the terms $\beta_0$ and $\beta_1$ from the model (Step 415). The detrended model $\tilde{y}_t$ may be represented as $\tilde{y}_t = y_t - \beta_0 - \beta_1 t$.

Monitoring program 260 then divides a frequency range P into a plurality of disjoint frequency intervals (Step 420). The frequency range P may be represented as $$P = \bigcup_{l=1}^{L} (c_l, d_l],$$

where $c_1$ may have a value of at least 2 divided by the number of metric data measured, and $d_1$ may be at most ½.

Monitoring program 260 determines a plurality of Fourier frequencies for estimating $\omega_k$, where $\omega_k = 2\pi k/n$, and k=0, 1, ..., [n/2] (Step 425). Based on the detrended model, monitoring program 260 determines values of a periodogram associated with each of the Fourier frequencies (Step 430). The periodogram may be represented as follows:

$$I(\omega_k) = \frac{n}{2\pi} \frac{(\hat{A}_k^2 + \hat{B}_k^2)}{4} = \frac{n}{2\pi} \hat{R}_k^2,$$

where $\hat{A}_k$ and $\hat{B}_k$ are the least square estimates of $A_k$ and $B_k$. Monitoring program 260 may identify harmonic components of the model by determining the Fourier frequencies that result in high values for the amplitude $\hat{R}_k^2$.

Monitoring program 260 then classifies the Fourier frequencies according to the frequency intervals identified in Step 425 (Step 435). In each of the frequency intervals, monitoring program 260 identifies the highest value of the periodogram (Step 440). Monitoring program 260 then tests the Fourier frequencies corresponding to the highest periodogram values for statistical significance using, for example, F-tests and selects those Fourier frequencies that are statistically significant at a predetermined level α (Step 445).

Figure 5:
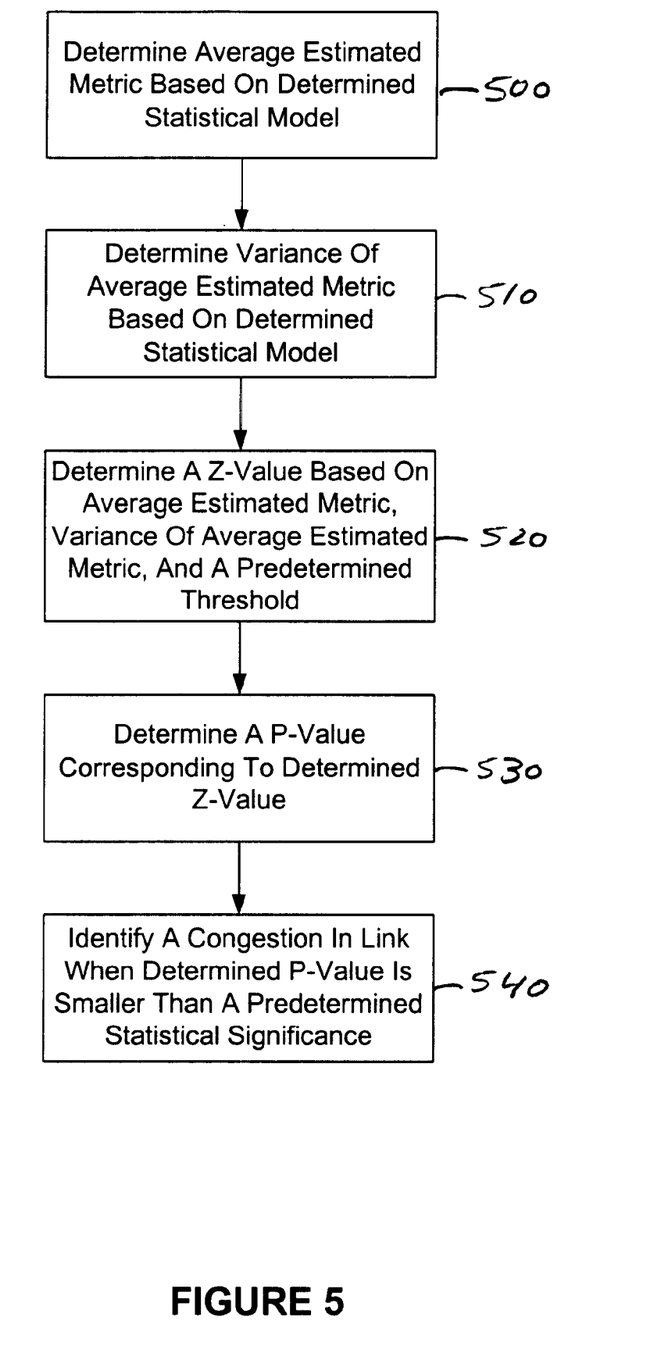
FIG. 5 is a flowchart of the steps for identifying a congestion in a link in a network, in accordance with methods and systems consistent with the present invention.

Based on the average estimated metric and the variance of the average estimated metric, monitoring program 260 may determine a z-value for each of links 120a–120m (Step 520). For example, monitoring program 260 may determine each z-value as follows:

$$z = \frac{\bar{y}_I - T}{\sqrt{\text{var}(\bar{y}_I)}},$$

where I is a fixed interval of time during which metric data associated with a link is measured, and T is a predetermined threshold that is transformed using, for example, an optimal transformation selected from the family of Box-Cox transformations.

By performing a look up on a Normal Table, monitoring program 260 determines the p-values corresponding to the z-values (Step 530). A p-value represents the probability of determining a value greater than a corresponding z-value when no congestion exists in a link. Accordingly, monitoring program 260 may determine that a congestion exists in a link when the determined p-value associated with the average is smaller than the predetermined statistical significance α (Step 540). As the predetermined statistical significance α decreases, the amount of evidence supporting the determination of a congestion increases.

Figure 6:
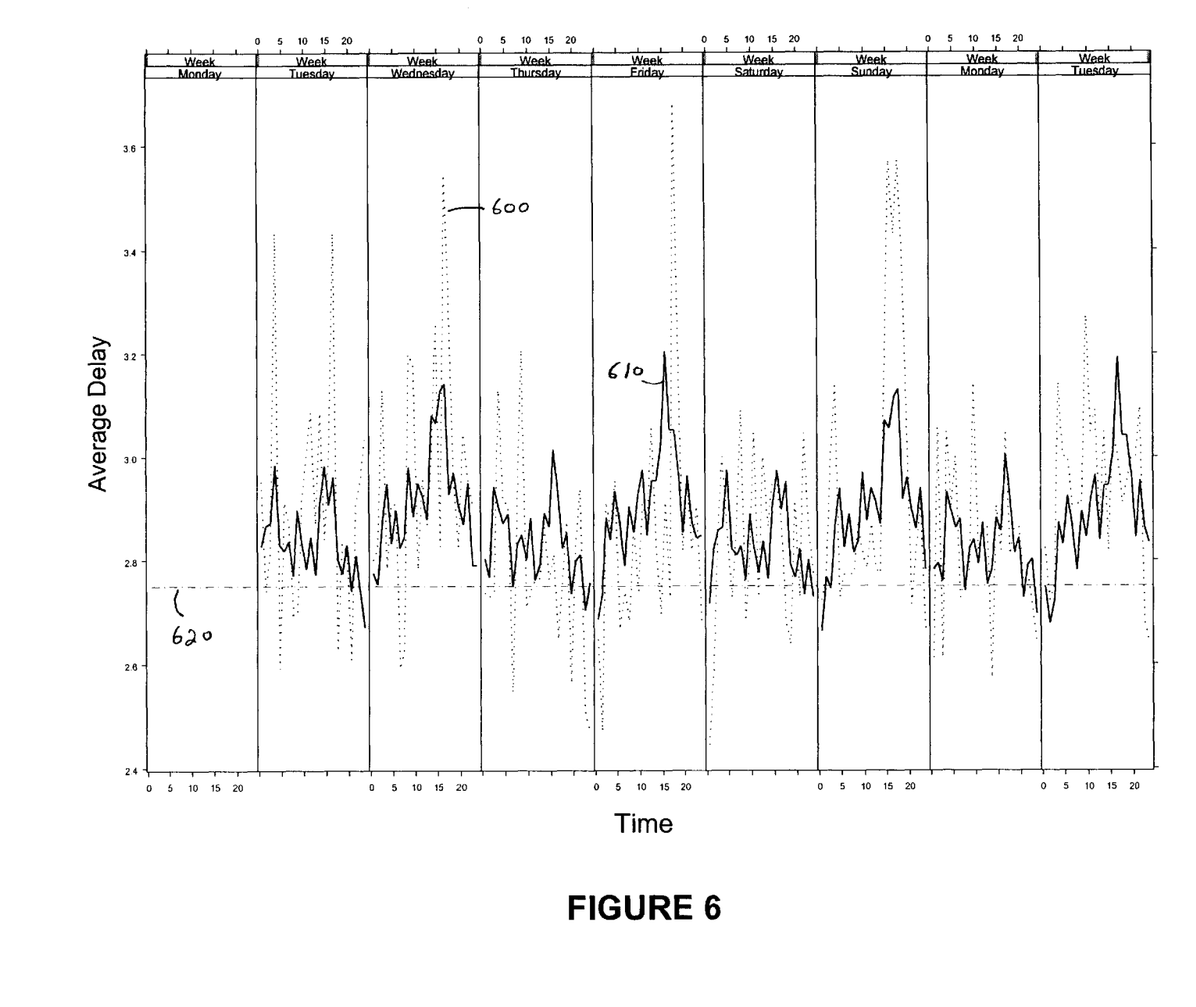
FIG. 6 is a graphical representation of measured metric data and estimated metric data associated with a link, in accordance with an embodiment of the invention.

FIG. 6 is a graphical representation of a measured metric data, such as average time delay, the associated estimated metric based on the model, and a predetermined threshold, in accordance with an embodiment of the invention. The measured metric data is illustrated with a dotted line 600; the estimated metric is illustrated with a solid line 610; and the predetermined threshold is illustrated with a dashed line 620. The predetermined threshold, which may be specified by a network administrator or user, sets an upper bound on a tolerable time delay associated with a link.

In the embodiment of FIG. 6, monitoring program 260 determines that the average estimated time delay over the interval of time I for a link is 2.82 msec. Assuming that the predetermined threshold for the link is 2.75, if the p-value of the average estimated time delay associated with the link is much smaller than the predetermined statistical significance α, for example $10^{-4}$, monitoring program 260 may then determine that the difference between the average estimated time delay of 2.82 msec and the predetermined threshold of 2.75 is statistically significant, and thus a congestion exists in the link. Thus, F-tests are described in Norman Draper and Harry Smith, "Applied Regression Analysis," second edition (1981), which is incorporated herein by reference.

Based on the selected Fourier frequencies, monitoring program 260 fits the model to the transformed metric data (Step 450). For example, monitoring program 260 may estimate the parameters of the harmonic components of the model using the ordinary least squares method such that the sum of squares of the difference between the measured metric data and those estimated by the model are minimized. Finally, after monitoring program 260 fits the model, monitoring program 260 may periodically measure new metric data associated with links 120a–120m and may update the model to better reflect changes in the state of links 120a–120m.

FIG. 5 is a flowchart of the steps performed by monitoring program 260 for identifying congestion in one or more links 120a–120m, in accordance with methods and systems consistent with the invention. Based on the model determined in Step 450 of FIG. 4, monitoring program 260 determines the average estimated metric associated with each of links 120a–120m (Step 500). For example, monitoring program 260 may determine the average estimated metric $\bar{y}_s$ associated with each of links 120a–120m as follows:

$$\bar{y}_s = \frac{1}{s}\int_0^s y(t)\,dt = \frac{1}{s}\left[\hat{\beta}_0 t\big|_0^s + \frac{\hat{\beta}_1 t^2}{2}\Big|_0^s - \frac{\hat{\beta}}{w}\cos(wt)\Big|_0^s + \frac{\hat{A}}{w}\sin(wt)|_0^s\right]; \text{ and } \bar{y}_s = \hat{\beta}_0 + \frac{\hat{\beta}_1 s^2}{2} - \frac{\hat{\beta}}{ws}(\cos(ws)-1) + \frac{\hat{A}}{ws}\sin(ws)$$

where the interval of time I=(0,s] and J=1.

Based on the model, monitoring program 260 may also determine the variance $Var(\hat{y}_s)$ of the average estimated metric associated with each of links 120a–120m as follows (Step 510):

$$Var(\hat{y}_s) = Var\left(\sum_{i=0}^{4} l_i \hat{\beta}_i\right) = Var(l'\hat{\beta})l'Var(\hat{\beta})l', \text{ where } Var(\hat{\beta})$$

is determined from the model. by comparing the p-value of the average estimated time delay with the predetermined statistical significance $\alpha$, monitoring program 260 may identify in the measured time delay data distribution those signals that are indicative of a congestion in the link, instead of identifying peaks and bursts that are mostly natural random variations in the measured time delay data and are not indicative of a congestion.

Figure 7:
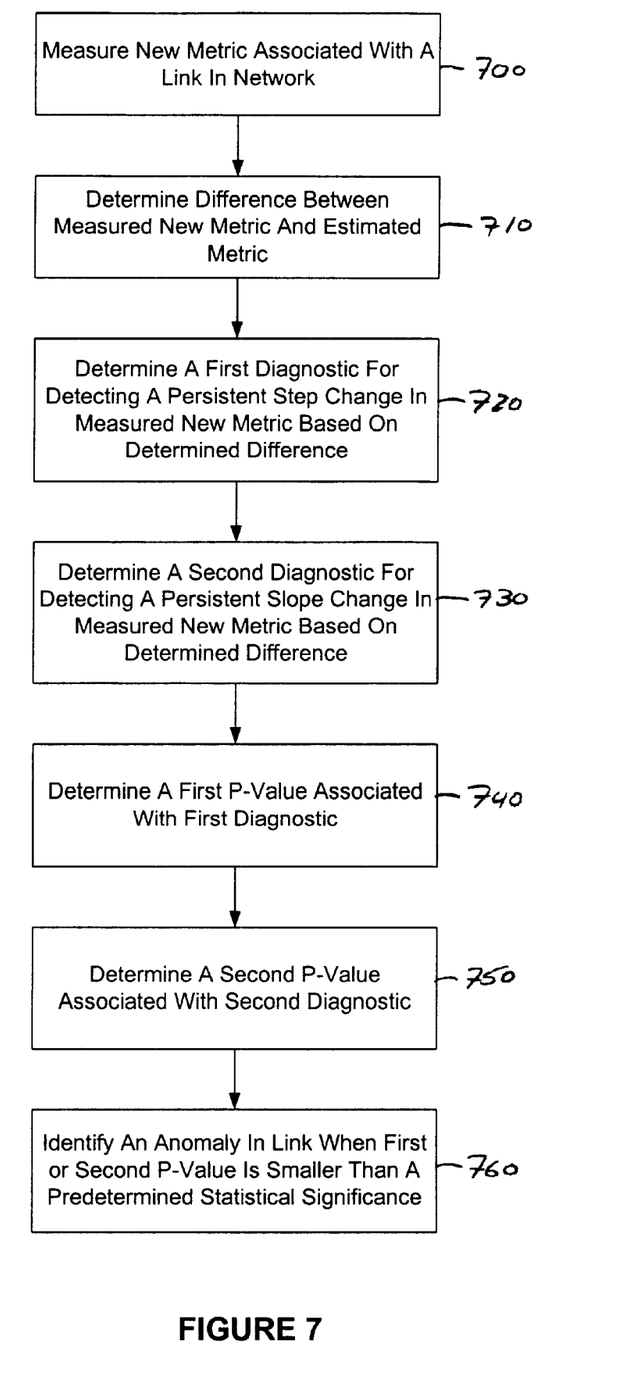
FIG. 7 is a flowchart of the steps for identifying an anomaly in a link in a network, in accordance with methods and systems consistent with the present invention.

FIG. 7 is a flowchart of the steps performed by monitoring program 260 for identifying anomalies in one or more links 120a–120m, in accordance with methods and systems consistent with the invention. Monitoring program 260 statistically models metrics associated with each of links 120a–120m under normal network conditions. Monitoring program 260 measures and transforms new metric data, such as average time delay associated with each of links 120a–120m, and stores the new metric data in database 280 (Step 700). Using the model, monitoring program 260 determines the estimated metrics associated with each link. Monitoring program 260 then determines the difference (i.e., the residual) between the new metric data and the estimated metrics (Step 710). The residual $r_t$ may be represented as $r_t = y_t - \hat{y}_t$, where $y_t$ represents a new metric data measured at time t, and $\hat{y}_t$ represents a transformed estimated metric at time t. Monitoring program 260 may determine $\hat{y}_t$ as follows:

$$\hat{y}_t = \hat{\beta}_0 + \hat{\beta}_1 t + \sum_{k=1}^{J}(\hat{A}_k \cos\omega_k t + \hat{B}_k \sin\omega_k t).$$

Since the distribution of the new metric data may be bursty, monitoring program 260 may determine that no anomaly exists in the link even when spikes or peaks appear in the distribution of the new metric data. To reliably identify anomalies in the link, monitoring program 260 may instead search for systematic patterns in the new metric data, such as persistent step change and persistent slope change. Accordingly, based on the residuals $r_t$, monitoring program 260 determines a first diagnostic for detecting a persistence step change in the new metric data (Step 720). The first diagnostic may be determined as $$Q_1 = \sum_{t \in I} r_t,$$

where I is a fixed interval of time during which new metric data associated with a link is collected. Similarly, based on the residuals $r_t$, monitoring program 260 determines a second diagnostic for detecting a persistent slope change in the measured metric data (Step 730). The second diagnostic may be represented as $$Q_2 = \sum_{t \in I} r_t t.$$

Monitoring program 260 determines a first p-value associated with the first diagnostic, which may be determined as follows (Step 740):

$$Q_1/\hat{\sigma}\sqrt{n + \left(\sum_{i=1}^{n} x_i'\right)(X'X)^{-1}\left(\sum_{i=1}^{n} x_i\right)},$$

where $x_i$ is vector of covariates for a new metric data $y_i$, and $\hat{\sigma}$ is the square root of the mean square error associated with the model.

Monitoring program 260 determines a second p-value associated with the second diagnostic, which may be determined as follows (Step 750):

$$Q_2/\hat{\sigma}\sqrt{\sum_{t \in I} t^2 + \left(\sum_{i=1}^{n} t_i x_i'\right)(X'X)^{-1}\left(\sum_{i=1}^{n} t_i x_i\right)}.$$

If the first or the second p-value is smaller than the predetermined statistical significance $\alpha$, monitoring program 260 then determines that an anomaly exists in the link and may, for example, generate an alarm message, which is displayed on a display device (Step 760). Otherwise, monitoring program 260 determines that no anomalies exist in the link.

Figure 8:
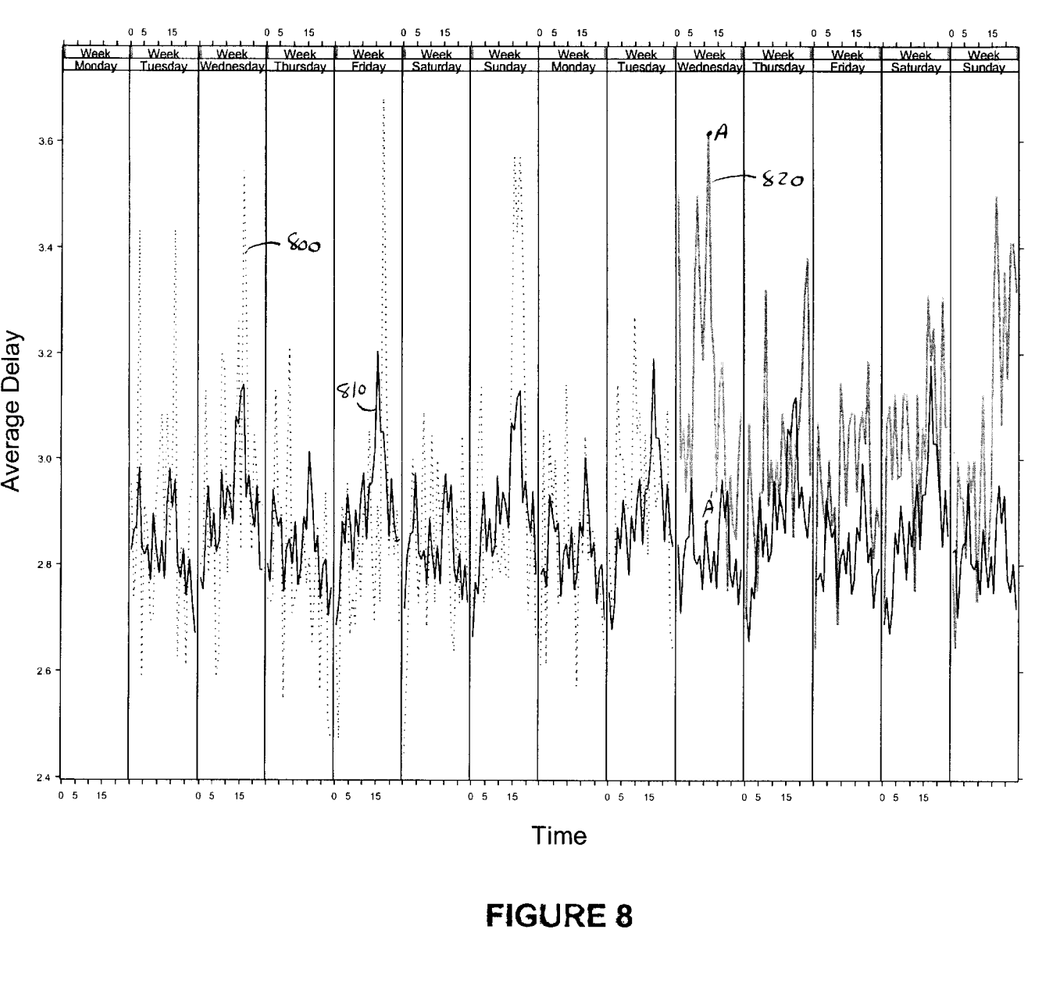
FIG. 8 is a graphical representation of metric data associated with a link from which a statistical model is determined based on a harmonic analysis, estimated metric data based on the model, and new metric data associated with the link, in accordance with an embodiment of the invention.

FIG. 8 is a graphical representation of metric data from which the model is determined, the estimated metric data based on the model, and new metric data associated with a link, in accordance with an embodiment of the invention. The dotted line 800 illustrates metric data (i.e., average time delay) from which the model is determined; the solid line

810 illustrates the estimated average time delay based on the model; and the shaded line 820 illustrates new metric data associated with a link in network 100.

As new metric data is measured, monitoring program 260 may compare the estimated average time delay shown as solid line 810 with the new metric data shown as shaded line 820. Monitoring program may determine in real-time an anomaly when the new metric data substantially departs from the estimated average time delay. For example, monitoring program 260 may identify point A on the new metric data line 820 as an anomaly because it substantially departs from a corresponding point A' on the estimated average time delay line 810. Accordingly, by statistically modeling metrics associated with each link under normal network conditions and monitoring the residual associated with each link, the monitoring station determines whether an anomaly exists in a link.

In an alternative embodiment, monitoring program 260 may determine for each of nodes 101–106 in network 100 a statistical model that is based on a harmonic analysis. Monitoring program 260 may determine the model using, for example, the method shown in FIG. 4, except that monitoring program 260 measures metric data associated with nodes 101–106. Using the model, monitoring program 260 then estimates metric data associated with each of nodes 101–106. Based on the estimated metric data, monitoring program 260 may determine whether congestion or anomalies exist in one or more nodes 101–106. Monitoring program 260 may identify the congestion and anomalies using the methods shown in FIGS. 5–8.

In yet another embodiment, monitoring program 260 may determine for each segment (not shown) in network 100 a statistical model that is based on a harmonic analysis. A segment may include, for example, one or more nodes 101–106 and links 120a–120m in network 100. Monitoring program 260 may determine the model using, for example, the method shown in FIG. 4, except that monitoring program 260 collects metric data associated with one or more segments. Using the model, monitoring program 260 then estimates metric data associated with each of the segments. Based on the estimated metric data, monitoring program 260 may determine whether congestion or anomalies exist in one or more of the segments. Monitoring program 260 may identify the congestion and anomalies using the methods shown in FIGS. 5–8.

While it has been illustrated and described what are at present is considered to be preferred embodiments and methods of the present invention, it will be understood by those skilled in the art that various changes and modifications may be made, and equivalents may be substituted for elements thereof without departing from the true scope of the invention. One skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. This invention should be limited only by the claims and equivalents thereof.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for identifying a congestion or an anomaly in a network, said method comprising the steps of:
   determining a statistical model based on a harmonic analysis;
   estimating a metric associated with one of a link, a node, or a segment in the network based on the determined model;
   identifying one or more congestion or anomalies in the link, node, or segment based on the estimated metric; and
   wherein the determining step comprises the steps of
      collecting metric data from the network;
      selecting a model that includes one or more harmonic components; and
      capturing a periodicity of the collected data in the harmonic components of the selected model.

2. The method of claim 1, wherein the estimating step comprises the step of estimating behavior of the metric based on the determined model.

3. A method for identifying a congestion or an anomaly in a network, said method comprising the steps of:
   determining a statistical model based on a harmonic analysis;
   estimating a metric associated with one of a link, node, or segment in the network based on the determined model; and
   identifying one or more congestion or anomalies in the link, node, or segment based on the metric,
   wherein the determining step comprises the steps of
      collecting from the network data relating to the metric;
   selecting a model that includes one more harmonic components; and
   capturing periodicity of the collected data in the harmonic components of the selected model, said capturing step comprising the steps of
      dividing a frequency range into a plurality of intervals;
      determining a plurality of Fourier frequencies;
      determining values of a periodogram associated with the determined Fourier frequencies, respectively;
      classifying the determined Fourier frequencies according to the intervals;
      identifying in each of the intervals the determined values of the periodogram that are highest;
      selecting the classified Fourier frequencies that correspond to the identified highest values and that are statistically significant; and
      estimating values of parameters of the harmonic components based on the collected data.

4. A method for identifying a congestion in a network, said method comprising the steps of:
   determining a statistical model based on a harmonic analysis;
   estimating a metric associated with one of a link, node, or segment in the network based on the determined model; and
   identifying a congestion in the link, node, or segment based on the estimated metric, said step of identifying a congestion comprising the steps of
      determining an average of the metric based on the determined model;
      determining a variance of the metric based on the determined model;
      determining a z-value based on the average, the variance, and a predetermined threshold;

determining a p-value corresponding to the determined z-value; and identifying the congestion when the p-value is smaller than a predetermined significance.

5. A method for identifying an anomaly in a network, said method comprising the steps of:

determining a statistical model based on a harmonic analysis;

estimating a metric associated with one of a link, a node, or a segment in the network based on the determined model; and identifying an anomaly in the link, node, or segment based on the estimated metric, the step of identifying an anomaly comprising the steps of determining a difference between a measured metric and the estimated metric;

determining a first diagnostic for detecting a persistent step change in the measured metric based on the determined difference;

determining a second diagnostic for detecting a persistent slope change in the measured metric based on the determined difference;

determining a first p-value associated with the first diagnostic;

determining a second p-value associated with the second diagnostic; and identifying the anomaly when the first p-value or the second p-value is smaller than a predetermined significance.

6. A method for identifying a congestion or an anomaly in a network, said method comprising the steps of:

receiving metric data associated with one of one or more links, nodes, or segments in the network;

capturing a periodicity of the received metric data in a statistical model that includes harmonic components;

estimating metric data associated with the links, nodes, or segments in the network based on the statistical model; and identifying one or more congestion or anomalies in one of the one more of the links, nodes or segments based on the estimated metric data.

7. A computer-readable medium capable of configuring a computer to perform a method for identifying a congestion or an anomaly in a network, said method comprising the steps of:

determining a statistical model based on a harmonic analysis by collecting from the network data relating to a metric associated with one of a link, node, or segment in the network, selecting a model that includes one or more harmonic components, and capturing a periodicity of the collected data in the harmonic components of the selected model;

estimating one or more metrics associated with one of one of the one or more links, nodes or segments in the network based on the determined statistical model; and identifying one or more congestion or anomalies in the links, nodes, or segments based on the estimated metrics.

8. A system for identifying a congestion or an anomaly in a network, said system comprising:

a memory including code for determining a statistical model based on a harmonic analysis, for estimating one or more metrics associated with one of one or more links, nodes, or segments in the network based on the determined statistical model, and for identifying one or more congestion or anomalies in the links, nodes, or segments based on the estimated metrics; and a processor for running the code.

* * * * *